No. 707,750. Patented Aug. 26, 1902.
L. WIRTZ.
MACHINE FOR MAKING CHAIN.
(Application filed Feb. 25, 1902.)
(No Model.) 4 Sheets—Sheet 1.

Witnesses
Inventor.

No. 707,750. Patented Aug. 26, 1902.
L. WIRTZ.
MACHINE FOR MAKING CHAIN.
(Application filed Feb. 25, 1902.)

(No Model.) 4 Sheets—Sheet 3.

Witnesses
John E. Bousfield.
C. G. Redfern

Inventor.
Louis Wirtz

No. 707,750. Patented Aug. 26, 1902.
L. WIRTZ.
MACHINE FOR MAKING CHAIN.
(Application filed Feb. 25, 1902.)
(No Model.) 4 Sheets—Sheet 4.
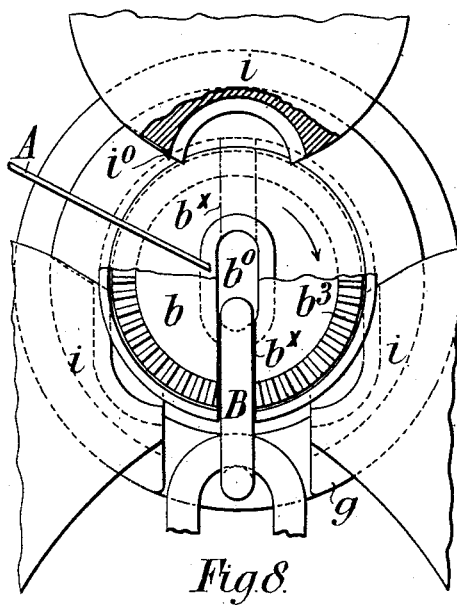
Fig. 5.
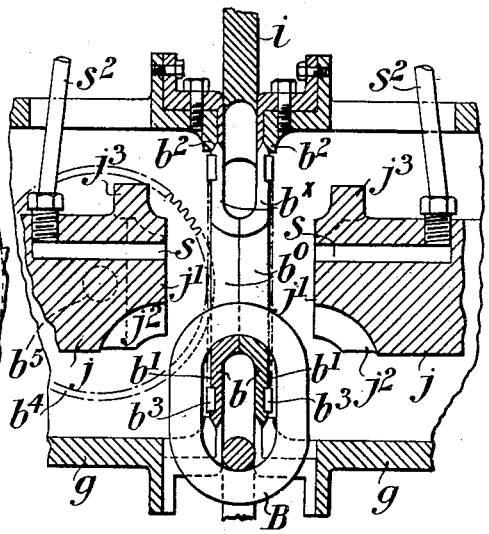
Fig. 4.
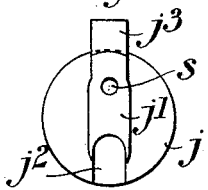
Fig. 8.
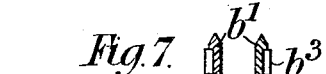
Fig. 7.
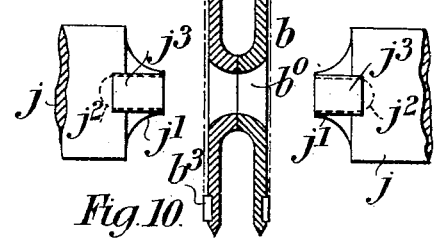
Fig. 10.
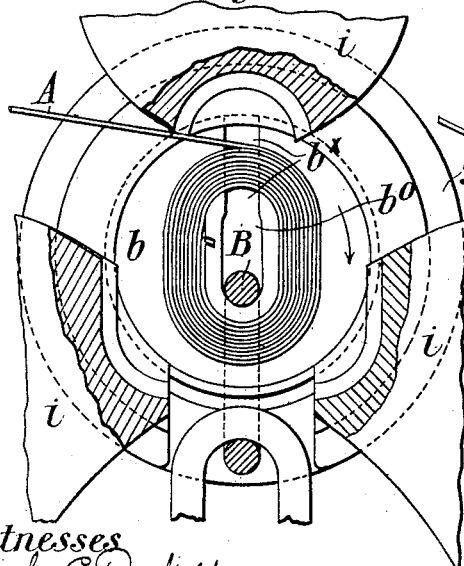
Fig. 9.
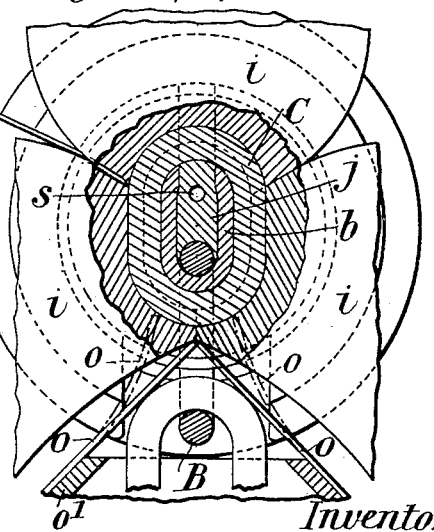
Witnesses
Inventor

UNITED STATES PATENT OFFICE.

LUIS WIRTZ, OF LONDON, ENGLAND.

MACHINE FOR MAKING CHAIN.

SPECIFICATION forming part of Letters Patent No. 707,750, dated August 23, 1902.

Application filed February 25, 1902. Serial No. 95,537. (No model.)

*To all whom it may concern:*

Be it known that I, LUIS WIRTZ, a subject of the King of Great Britain, residing at 62 Upper Tollington Park, in the county of London, England, have invented new and useful Improvements in Machines for Manufacturing Chain, of which the following is a specification.

This invention consists in the novel features hereinafter described, reference being had to the accompanying drawings, which illustrate one form in which I have contemplated embodying my invention, and said invention is fully disclosed in the following description and claims.

According to the invention the links instead of being made of separate pieces of metal rod, as heretofore, are each made of wire of steel or wrought-iron coiled a sufficient number of times to make a link of the desired thickness, the coiled wire being then subjected to hydraulic pressure to weld it into a link. Prior to its being coiled the wire is advantageously heated, electrically or otherwise, to give it the necessary temperature to enable it to be welded.

To enable my invention to be fully understood, I will describe the same by reference to the accompanying drawings, in which—

Figure 1 is a sectional side elevation of a suitable machine for the manufacture of chain according to my invention. Fig. 2 is a sectional plan, and Fig. 3 a sectional end elevation, of the same; and Figs. 4 to 13 are details, hereinafter described.

$a$ is a drum supported in bearings $a'$ in standards $a^0$, and upon which drum is coiled the wire A, from which the chain is to be formed. The bearings $a'$ are each provided with a hinged cap $a^2$, which can be turned back from the position shown in Fig. 1 to enable the drum from which all the wire has been used to be removed and another full one substituted.

$b$ is a matrix or die on which the wire A is coiled to form a link, the said die being somewhat in the form of a grooved pulley, as shown clearly in Fig. 4, which is a vertical section of the said die and adjoining parts, the metal at the bottom of the groove being of the shape of the inner surface of a link. The said die is formed in halves, which when moved apart enable the finished link to be released, the joint between the halves when together being midway between the flanges of the die. As shown in Fig. 4 and also in Fig. 5, which is a sectional side elevation showing the die and adjoining parts, the die $b$ is provided with an elongated central opening $b^0$ and with slots $b^\times$ in each of its flanges, the said slots serving to allow a link B already formed to be inclosed in position in the said die, while the opening allows the said die to be then rotated through the link to wind the wire A to form the next link. The wire A passes from the drum $a$ between guide-pulleys $a^3$ $a^3$, pulleys $a^4$ $a^5$, around guide-pulleys $a^6$ $a^6$, and between pulleys $a^7$ $a^8$ to the die $b$, the pulleys $a^5$ $a^8$ being of porcelain or other material which is a non-conductor of electricity and the pulleys $a^4$ and $a^7$ of copper or other good conducting material. The pulleys $a^4$ and $a^5$ are carried by brackets $a^9$ $a^9$, forming extensions of the standards $a^0$ $a^0$, supporting the drum $a$, while the pulleys $a^7$ and $a^8$ are carried by a bracket $a^{10}$ on the main frame $c$ of the machine. The pulleys $a^4$ and $a^7$ are kept pressed against the pulleys $a^5$ and $a^8$ by springs $a^{11}$, binding-posts $a^{12}$ being attached to the brackets $a^9$ and $a^{10}$, to which are connected the wires from a dynamo or other source of electricity, by which a current is generated to pass through the portion of the wire A extending between the pulleys $a^4$ and $a^7$ to produce the requisite heat in the wire to enable it to be subsequently welded into a link. The drum $a$ and the frame $c$ of the machine and its connections are insulated to prevent any leakage of the electric current.

The pulleys $a^5$ and $a^8$ are mounted upon shafts $a^{13}$ and $a^{14}$, respectively, carrying sprocket-wheels $a^{15}$ and $a^{16}$, connected by a chain $a^{17}$, the said wheels being of such dimensions that the wire is fed by the two pairs of pulleys at the same rate of speed, so as to avoid any distortion of the heated wire. The shaft $a^{14}$ is driven from the main shaft $d$ of the machine through the medium of the sprocket-wheel $d'$, chain $d^2$, sprocket-wheel $d^3$, shaft $e$, clutch $e'$, sprocket-wheel $e^2$, chain $e^3$, and sprocket-wheel $e^4$, the clutch $e'$ being operated from the cam-groove $e^0$ in a cam-cylinder $f$ through the medium of a clutch-lever $e^\times$.

The die $b$ is formed with circular flanges $b'$ $b'$, Fig. 4, so that it can rotate in bearings $b^2$ $b^2$ to enable the wire A to be coiled, each of the halves of the die being provided with a ring of gear-teeth $b^3$, designed to be rotated from the shaft $e$ through the medium of a gear-wheel $b^4$, shaft $b^5$, bevel-wheels $b^6$, shaft $b^7$, sprocket-wheel $b^8$, chain $b^9$, and sprocket-wheel $b^{10}$, Figs. 2 and 3.

The bearings $b^2 b^2$ are formed in cylindrical framings $g$ $g$, Fig. 2, provided with extensions $g'$ $g'$, designed to slide in guides $g^2$ $g^2$, whereby the two halves of the die $b$ can be moved toward or away from one another, as hereinafter described. Suitable means for effecting the said sliding movement on the halves of the die $b$ are shown in Fig. 2 and also in Fig. 6, which is a section on the line 6 6 of Fig. 2 to a larger scale, and comprise levers $g^3$ $g^3$, jointed at one end to the framings $g$ $g$ and at the other end engaging with cam-grooves $g^4$ $g^4$ in the cam-cylinder $f$.

As the winding of the wire on the die $b$ is intermittently performed while the main shaft $d$ is continuously rotated, the clutch $e'$ serves for starting and stopping it at the required moment, and as a definite number of coils of the wire A is required to form one complete link it is necessary to stop the rotation of the die simultaneously with the operation of the clutch—that is to say, to prevent the die overrunning. Suitable means for this purpose comprise stop-pins $h$, Fig. 6, on the pinions which mesh with the bevel-gear $b^6$ and levers $h'$, carried on the framings $g$ $g$, having shoulders or projections $h^2$, designed to be interposed in the paths of the stop-pins $h$, the said levers being actuated in one direction to stop the said bevel-pinions by the one ends of the levers $h^3$, the other ends of which are actuated by cam-grooves $h^4$ in the cam-cylinder $f$ and in the opposite direction by springs $h^5$. To form the outer surface of each link, I employ outer dies $i$ $i$ $i$, Figs. 1 and 5, and on the ends of rams $i'$ $i'$ $i'$, the said rams being advantageously three in number, arranged at an angle of one hundred and twenty degrees to one another, the dies $i$ $i$ $i$ being shaped so that when brought together, as shown in Fig. 1, they inclose a space corresponding to the periphery of the link to be formed, the heated wire coiled on the die $b$ being pressed by the said dies $i$ $i$ $i$ to form the link. One of the dies $i$—for instance, the upper one—is formed with a suitable cutting edge $i^0$, designed to sever the wire as the said dies meet together to form the link.

$j$ $j$ are hydraulic rams, which I employ for supporting the halves of the die $b$ while pressure is imparted to the wire A on the said die $b$ to form the link, the said rams working horizontally. These rams slide through and serve as additional supports for the cylindrical frames $g$ $g$, as shown clearly in Fig. 2. The ends of the rams $j$ $j$ are formed with projections $j'$ $j'$, designed to enter the opening $b^0$ of the die, with recesses $j^2$ $j^2$ to fit over the link B already formed and with projections $j^3$ $j^3$, which enter the slots $b^\times$ $b^\times$, these projections serving to complete the die $b$ and prevent the link from being squeezed out through the openings $b^\times$ $b^\times$.

Fig. 7 is a sectional plan showing the die $b$ and the ends of the two rams $j$, and Fig. 8 is an end view of one of the rams $j$.

Fig. 9 is a view somewhat similar to Fig. 5, showing the wire A coiled on the die $b$ to form a link.

Figure 1:
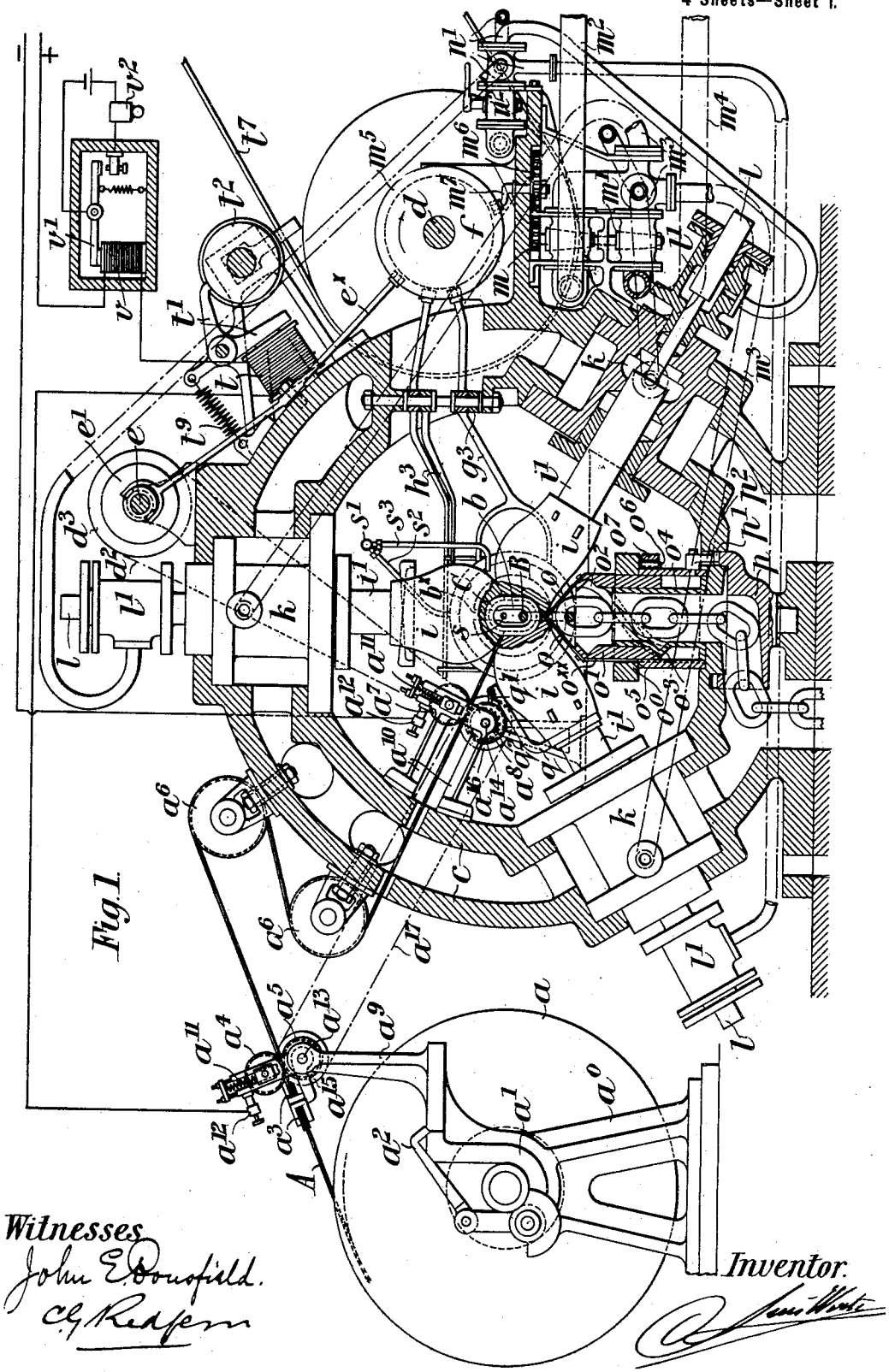
Figure 2:
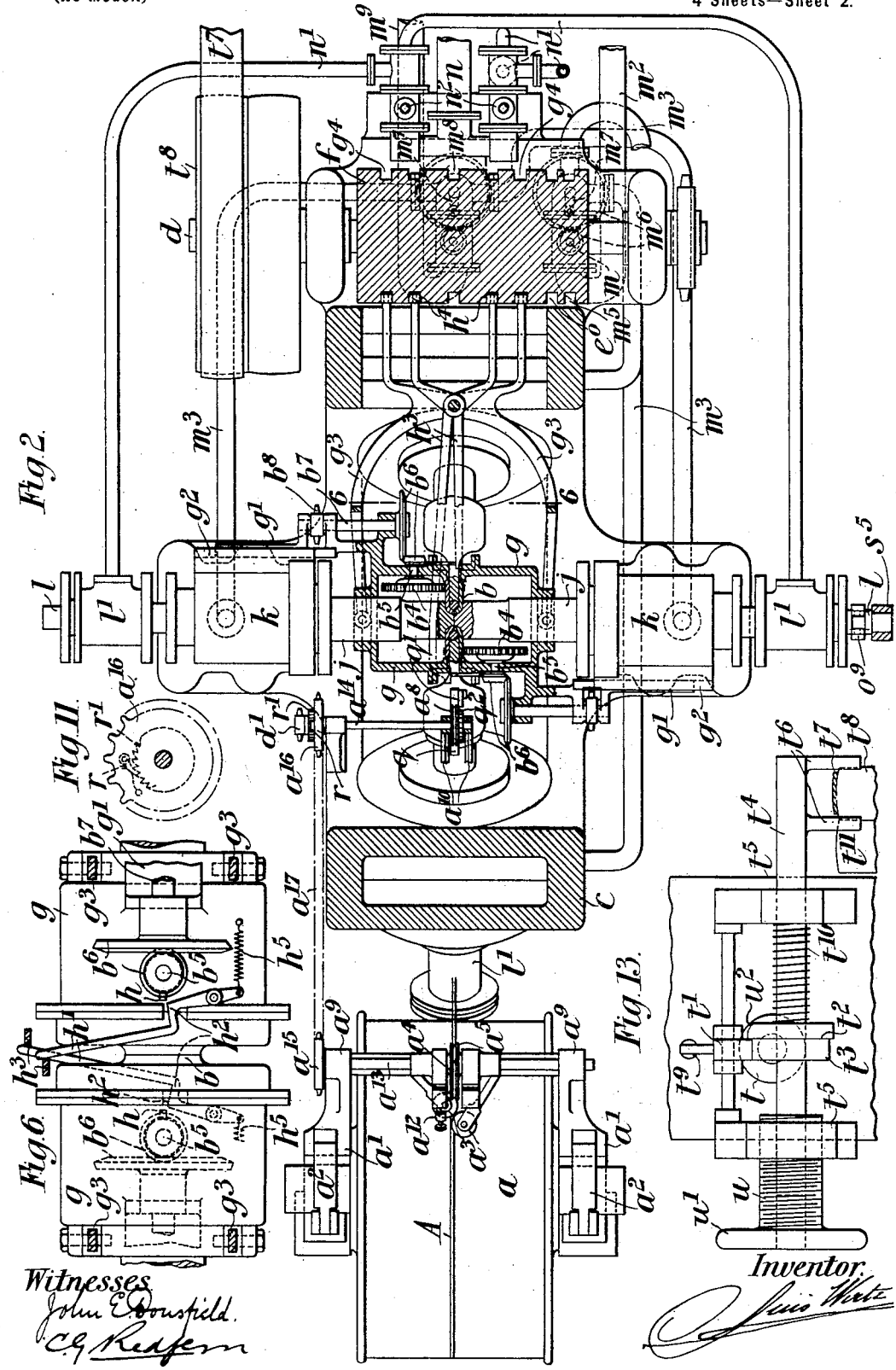
Figure 3:
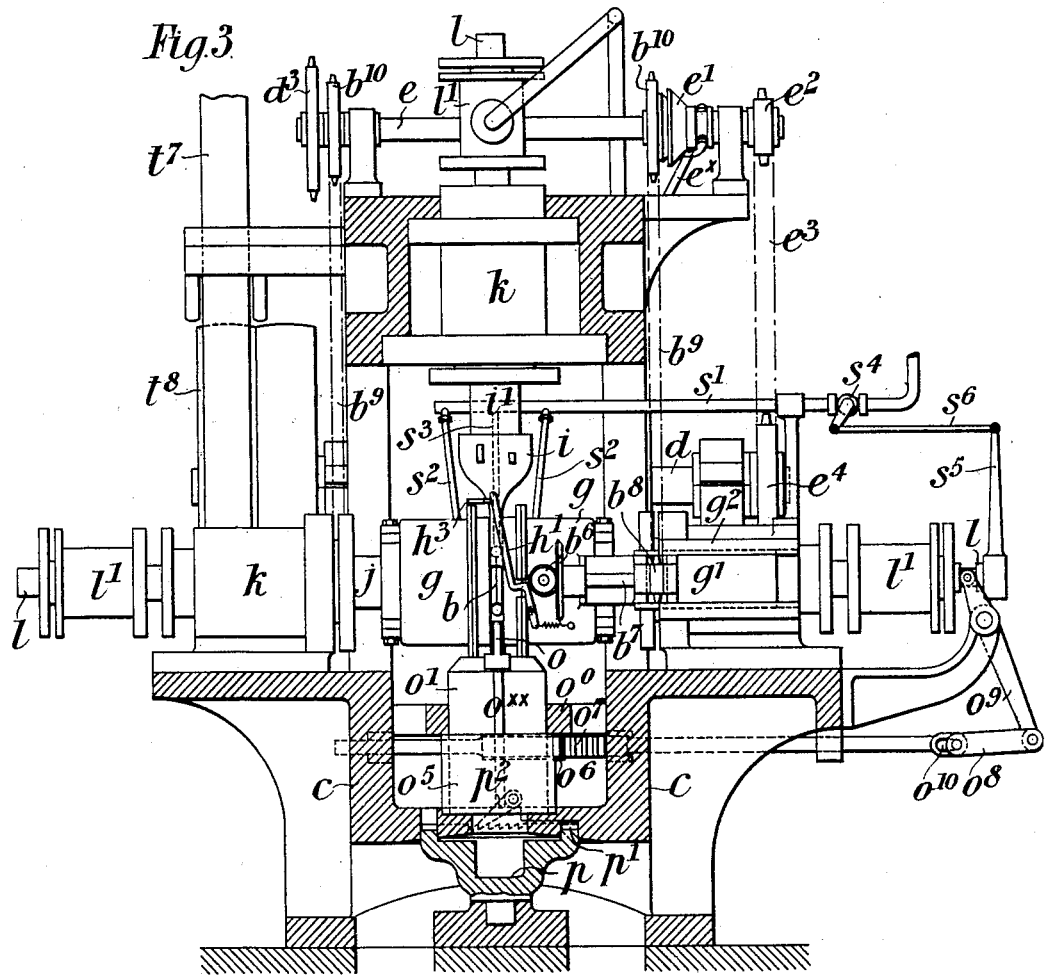

The rams $i'$ $i'$ $i'$ and $j$ $j$ work in hydraulic cylinders $k$ $k$, Figs. 1, 2, and 3, and are connected to smaller and opposing rams $l$ $l$, working in hydraulic cylinders $l'$ $l'$, the water-pressure being constantly exerted on the face of the rams $l$ $l$, while the water-pressure is allowed to act upon the larger rams only when it is required to force them out to form a link, the supply to the cylinders $k$ $k$ being cut off and the water therein allowed to exhaust when it is required to withdraw the rams after the formation of the link, the pressure upon the rams $l$ $l$ effecting such withdrawal.

For controlling the supply of water to the cylinders $k$ $k$ of the rams $i'$ $i'$ $i'$ I employ two rotary plug-valves $m$ $m'$, Fig. 1, the valve $m$ serving to admit the water-pressure from the common supply-pipe $m^2$ through the pipes $m^3$ to the cylinders $k$ $k$ $k$ of the said rams, while the valve $m'$ serves to allow of the discharge of the water from the said cylinders back through the pipes $m^3$ and into the common discharge-pipe $m^4$. The valves $m$ and $m'$ are arranged upon a common stem designed to be actuated from a cam-groove $m^5$ in the cam-cylinder $f$ through the medium of gear-wheels $m^6$ and lever $m^7$, the outer end of which engages the said cam-groove, the said valves being so arranged that when one is open the other is closed. The hydraulic cylinders $k$ $k$ of the rams $j$ $j$ are controlled by valves similar to the valves $m$ $m'$ and operated in a similar manner from a cam-groove $m^8$ in the cam-cylinder $f$, as shown in Fig. 2, the common supply-pipe for the water-pressure being shown at $m^9$. The hydraulic cylinders of all the rams $l$ are supplied with water-pressure from a common pipe $n$ through the medium of branch pipes $n'$, valves $n^2$ being arranged in connection therewith to shut off the supply of water when required. After a link is formed the dies $i$ $i$ $i$ are withdrawn from the link and the rams $j$ $j$ are moved just clear of the die $b$, so that the latter can turn the slot $b^\times$ from the highest to its lowest point (shown in Fig. 5) in order that the link previously formed can pass through the said slot when the halves of the die $b$ are opened to enable the finished link to fall between them. The newly-formed link then falls and rests upon the upper ends of two spring-blades $o$ $o$, which are in the position indicated in dotted lines in Fig. 10, which is a sectional elevation indicating the newly-formed link C after having been pressed by the dies $i$ $i$ $i$. The said spring-blades $o$ $o$ are caused to assume the position shown in the full lines in the said figure and in Fig. 1 while the said dies are pressing the link.

In order that the newly-formed link shall be placed in position between the halves of the die $b$ so that another link can be formed to engage therewith, it is necessary that the said newly-formed link after the dies have opened to release it shall move down and at the same time be turned through an angle of ninety degrees in order that when the halves of the die again come together the said link will pass through the slot $b^\times$ and engage the opening $b^0$, as indicated in Fig. 5. For effecting this turning movement I advantageously arrange the spring-blades $o\ o$, which support the newly-formed link, on a hollow cylinder $o'$ in a bearing $o^0$ in the frame $c$, through which the chain as it is formed can pass, the interior of this cylinder being provided with a portion of a female screw-thread $o^2$, Fig. 1, engaging with a corresponding male thread $o^3$ on a cylinder $o^4$, fixed to the lower part of the frame $c$, so that by rotating the cylinder $o'$ through an angle of ninety degrees it will be moved longitudinally on its axis. For rotating the cylinder $o'$ I advantageously make use of a ram $l$ of one of the rams $j\ j$, as shown in Fig. 3. For this purpose the cylinder $o'$ is keyed by a sliding key $o^{\times\times}$ to another cylinder $o^5$, which is prevented from moving longitudinally on its axis. This cylinder $o^5$ is caused to rotate by the movement of the outer end of the said ram $l$ through the medium of gear-teeth $o^6$ on the said cylinder, rack $o^7$, link $o^8$, and lever $o^9$, the end of the rod of the rack $o^7$ where it engages the link $o^8$ being slotted, as at $o^{10}$, for a purpose hereinafter described.

To prevent the weight of the chain after a great many links have been made from being wholly supported upon the spring-blades $o\ o$, which are comparatively weak, I arrange an intermediate table or support $p$, which will take the weight of the greater part of the chain, only a few links being carried by the spring-blades $o$. As, however, the movement of each newly-formed link through an angle of ninety degrees would twist the chain and interfere with its delivery from the machine, I provide for turning the table $p$ also through an angle of ninety degrees to correspond with the movement of the newly-formed link. This is advantageously effected by forming the table with a ring of ratchet-teeth $p'$ on its upper surface, with which engages a pawl $p^2$ on the cylinder $o^5$, so that the latter at the same time that it rotates and lowers the newly-formed link will rotate the table $p$ to correspond, while in its backward movement—that is to say, after it has left the newly-formed link in position for engaging with the halves of the die $b$ when they again close—and as it moves upwardly will draw the pawl $p^2$ back over the teeth $p'$ without rotating the table $p$. Before the halves of the die $b$ again close it is necessary that the wire $A$ should be inserted between their central projecting portions, so as to be gripped thereby, in order that the die $b$ can again wind the wire to form another link. This preliminary movement of the wire I advantageously effect through the medium of one of the rams $i'$ in its backward movement after pressing the last link, and for this purpose I provide it with an arm $q$, Figs. 1 and 2, carrying a pawl $q'$, which comes into engagement with a ratchet-wheel $q^2$ on the shaft $a^{14}$ of the feed-pulley $a^8$. In order that this movement can be effected without operating the sprocket-wheels $d'$ and $d^3$, and consequently the shaft $e$, I advantageously arrange a pawl $r$, Figs. 2 and 11, upon the sprocket-wheel $a^{16}$ and a ratchet-wheel $r'$ in connection with the sprocket-wheel $d'$, so that as the pulley $a^8$ is rotated by the pawl $q'$ the pawl $r$ will be caused to override the ratchet-wheel $r'$. I arrange for cooling the die $b$ by means of water, and for this purpose I advantageously provide the ends of the rams $j\ j$ with holes $s\ s$, Figs. 4 and 8, through which holes the water can flow on to the exterior of the die, the said holes being in connection with the supply-pipe $s'$, Fig. 3, by means of flexible pipes $s^2\ s^2$, a third pipe $s^3$, connected with the pipe $s'$, serving to discharge water into the groove in the die $b$. The supply of water through the pipe $s'$ is advantageously controlled by a plug-valve $s^4$ from one of the rams $l$ of one of the horizontal rams $j$ through the medium of an arm $s^5$ on the said ram and a link $s^6$, connecting the said arm with the handle of the valve $s^4$.

Figure 12:

The operation of the machine is as follows: Assume the parts to be in the position shown in Fig. 5—that is to say, with the halves of the die $b$ gripping the end of the wire $A$ between their central portions, the rams $i'\ i'\ i'$ and $j\ j$ in their retracted positions, the projecting portions $h^2\ h^2$ of the levers $h'\ h'$ in engagement with the stop-pins $h$ of the pinions of the bevel-gear $b^6$, and the ends of the levers $g^3\ g^3$, $e^\times$, $h^3\ h^3$, and $m^7\ m^7$ in their respective cam-grooves in the position shown in Fig. 12, which is a development of the surface of the cam-cylinder $g$. The said cam $g$ is now rotated in the direction of the arrow, Figs. 1 and 12, and will cause the levers $h^3\ h^3$ through the medium of the inclines 1 1 1 of the cam-grooves $h^4\ h^4$ and $e^0$ to disengage projecting portions $h^2$ of the lever $h'$ from the stop-pins $h$ and at the same time operate the clutch-lever $e^\times$ to throw the clutch $e'$ into gear, and thereby rotate the die $b$ to wind the necessary amount of heated wire $A$ thereon to form a link, as shown in Fig. 9. The inclines 2 2 2 of the said grooves will then cause the clutch-lever $e^\times$ to disengage the clutch $e'$ and the levers $h^3\ h^3$ to again insure the stopping of the pinions of the bevel-gears $b^6$ to stop the winding of the wire $A$, the die $b$ stopping with the slots $b^\times$ at the top, as shown in Fig. 9. The incline 3 of the cam-groove $m^8$ then operates the lever $m^7$ to admit water to the cylinders $k$ of the rams $j\ j$, which will then move against the die $b$, their projections $j^3$ entering the slots $b^×$ of the said die. The incline 4 of the cam-groove $m^5$ then operates on the other lever $m^7$ to admit water to the hydraulic cylinders $k$ of the rams $i'\,i'\,i'$, which are then consequently moved forward to press the heated wire by the dies $i\,i\,i$ so as to form a homogeneous link C, as shown in Fig. 10. The incline 5 of the cam-groove $m^5$ then operates the lever $m^7$ to shut off the water to the cylinders $k$ of the rams $i'\,i'\,i'$, so that the water-pressure on the rams $l\,l$ causes them to be retracted. The double incline 6 of the cam-groove $m^8$ then admits water to the cylinders $k$ of the rams $j\,j$ to retract them clear of the die $b$, the slot $o^{10}$ in the outer end of the rack-bar $o^7$ allowing of this movement without rotating the cylinder $o'$. The double inclines 7 7 7 of the cam-grooves $h^4\,h^4$ and $e^0$ then again throw the clutch $e'$ into gear and allow the die $b$ to revolve sufficiently to bring the slot $b^×$ in the said die into its lowermost position, as indicated in Fig. 5. The inclines 8 8 8 of the cam-grooves $g^4\,g^4$ and $m^8$ then operate, respectively, the levers $g^3$ $g^3$ and $m^7$ to withdraw the haves of the die $b$ and to admit water to the hydraulic cylinders $k$ to complete the backward movement of the rams $j\,j$, the finished link at the same time being revolved through an angle of ninety degrees and lowered so as to bring it into position to engage the slots $b^×$ of the die $b$ when it is again closed. The inclines 9 9 of the cam-grooves $g^4\,g^4$ then act upon the levers $g^3\,g^3$ to again close the dies and grip the end of the wire A, which had previously been fed sufficiently forward for the purpose by backward movement by one of the rams $i'$, as hereinbefore described, thus completing the cycle of operation for the formation of one link. The operation then begins again *de novo*.

In order that when all the wire A on the feed-drum has been exhausted the machine shall be automatically stopped, I provide means for effecting this electrically. Suitable means for this purpose comprise an electromagnet $t$, Figs. 1 and 13, arranged in the electric circuit for heating the wire A and having a pivoted armature $t'$, provided with an extension designed to engage with a shoulder $t^2$ on a collar $t^3$ on a bar $t^4$, sliding in guides $t^5$ and provided with a fork $t^6$ to embrace the driving-belt $t^7$, passing around the driving-pulley $t^8$ of the shaft $d$. So long as the wire A extends between the pulleys $a^4$ and $a^7$, so as to complete the electric circuit, the magnet $t$ attracts the armature $t'$; but when the circuit is broken by the end of the wire A having passed from contact with the pulley $a^4$ the armature $t'$ is released from the attraction of the magnet $t$ by a spring $t^9$, thus allowing the collar $t^3$ to be moved by a spring $t^{10}$ and shift the belt $t^7$ from the driven pulley $t^8$ to a loose pulley $t^{11}$. For reëngaging the collar $t^3$ with the armature $t'$ I advantageously provide a screw $u$, engaging a female screw-thread in one of the guides $t^5$ and provided with a hand-wheel $u'$, so that by rotating the said screw it will force the collar $t^3$ back until the armature $t'$ reëngages it, an incline $u^2$ on the said collar serving to allow the armature to ride over the collar into position behind the shoulder $t^2$. The hand-wheel $u'$ is then turned back, so as to retract the screw $u$ into the position shown in Fig. 13.

In addition to the means for automatically stopping the machine I arrange a telltale to notify the fact. Means suitable for this purpose comprise an electromagnet $v$ in the electric circuit in series with the magnet $t$, the armature $v'$ of which magnet $v$ when the circuit is broken in the manner hereinbefore described is arranged to close the circuit of a local battery and ring a bell $v^2$.

Having now particularly described and ascertained the nature of my said invention and in what manner the same is to be performed, I declare that what I claim is—

1. In a machine for the manufacture of chain, the combination of wire-feeding mechanism, of a grooved die on which the wire is coiled, of means for rotating the die, of a series of outer dies for entering the groove and pressing the coils so as to weld them together to form a link and means for operating the dies, substantially as described.

2. In a machine for the manufacture of chain, the combination of means for heating wire, of a grooved die onto which the heated wire is coiled, the said die being in halves to release the link subsequently formed thereon, of means for moving the halves relatively, of means for rotating the die, of a series of outer dies for entering the groove and pressing the coils so as to weld them together to form a link, of means for operating the said outer dies, of rams or supports for the halves of the die while the pressure is being exerted and of means for operating them substantially as described.

3. In a machine for the manufacture of chain the combination of means for heating a wire and feeding the same to a grooved die on which the heated wire is coiled, the said die being in halves to release the link subsequently formed thereon and having slots to embrace the last-formed link, of means for moving the halves of the die relatively, of means for rotating the die, of a series of outer dies for entering the groove and pressing the coils so as to weld them together to form a link, of means for operating the said outer dies, of rams or supports for the halves of the die while the pressure is being exerted, the said rams having projections for entering the slots in the grooved die, and of means for operating the said rams, substantially as described.

4. In a machine for the manufacture of chain the combination of means for electrically heating a wire, and for feeding the same, of a grooved die on which the heated wire is coiled, the said die being in halves to release the link subsequently formed thereon and having slots to embrace the last-formed link, of means for rotating the die, of a series of outer dies for entering the groove and pressing the coils so as to weld them together to form a link, of means for operating the said outer dies, of rams or supports for the halves of the die while the pressure is being exerted, the said rams having projections for entering the slots in the grooved die, of means for operating the said rams, of a support for receiving the finished link and turning and lowering it into position to be engaged by the next formed link and of means for operating the support, substantially as described.

5. In a machine for the manufacture of chain the combination of means for electrically heating a wire and for feeding the same, of a grooved die on which the heated wire is coiled, the said die being formed in halves to release the link subsequently formed thereon and with slots to embrace the last-formed link, of means for moving the halves of the die relatively, of means for rotating the die, of a series of outer dies for entering the groove and pressing the coils so as to weld them together to form a link, of means for operating the said outer dies, of rams or supports for the halves of the die while the pressure is being exerted, the said rams having projections for entering the slots in the grooved die, of means for operating the said rams, of a support for receiving the finished link and turning and lowering it into position to be engaged by the next formed link, of means for operating the said support, of a table to receive the chain as it is formed and turn it to correspond with the movement of the last-formed link and of means for turning the table, substantially as described.

LUIS WIRTZ.

Witnesses:
JOHN E. BOUSFIELD,
C. G. REDFERN.